No. 755,216. PATENTED MAR. 22, 1904.
J. W. CARRIER.
ICE CREAM FREEZER.
APPLICATION FILED JULY 27, 1903.
NO MODEL.
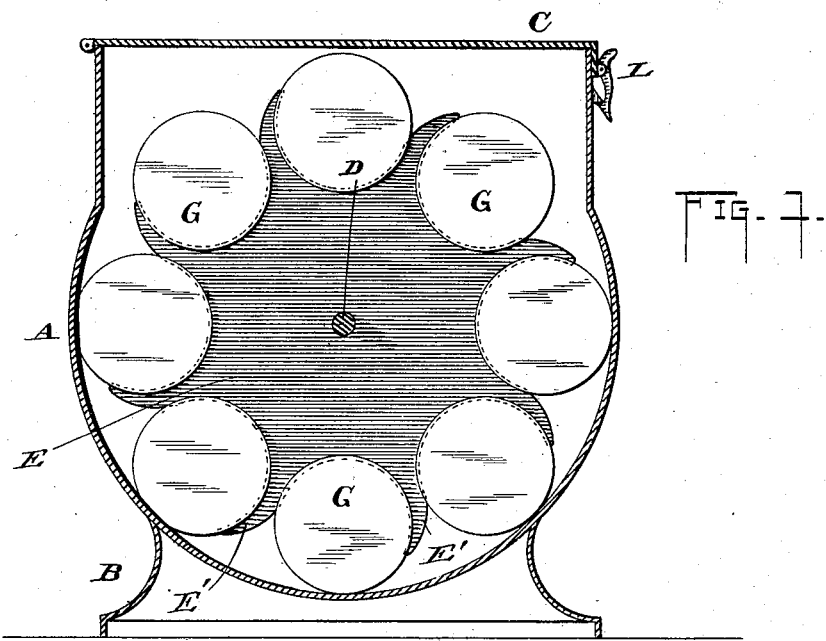
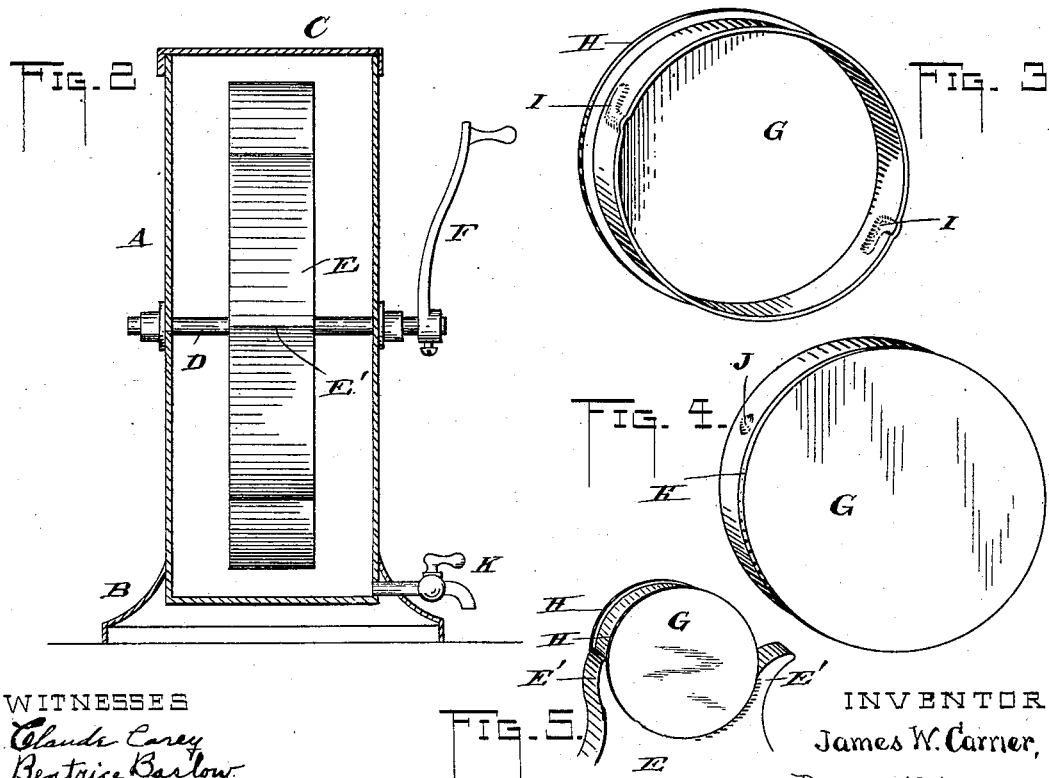
WITNESSES
Claude Carey
Beatrice Barlow
INVENTOR
James W. Carrier,
BY L. N. Thurlow
ATT'Y No. 755,216. Patented March 22, 1904.

UNITED STATES PATENT OFFICE.

JAMES W. CARRIER, OF PEORIA, ILLINOIS, ASSIGNOR TO FRANK C. HITCHCOCK, OF PRINCEVILLE, ILLINOIS.

ICE-CREAM FREEZER.

SPECIFICATION forming part of Letters Patent No. 755,216, dated March 22, 1904.

Application filed July 27, 1903. Serial No. 167,097. (No model.)

*To all whom it may concern:*

Be it known that I, JAMES W. CARRIER, a citizen of the United States, residing at Peoria, in the county of Peoria and State of Illinois, have invented certain new and useful Improvements in Ice-Cream Freezers; and I do hereby declare that the following is a full, clear, and exact description of the invention, which will enable others skilled in the art to which it appertains to make and use the same.

This invention pertains to improvements in ice-cream freezers.

The object of the invention is to provide a device for freezing small quantities of cream in a short time, usually from two to three minutes.

A further object is to provide a new structure in ice-cream freezers to my knowledge not heretofore employed.

In the accompanying drawings, Figure 1 is a side elevation of my improved freezer, showing the casing thereof in section and the interior mechanism. Fig. 2 is a sectional end view of the freezer, showing the interior mechanism shown in Fig. 1. Fig. 3 is a perspective view of a half cell or container for the ice-cream. Fig. 4 is a second half adapted to engage the first to form the completed cell. Fig. 5 is a perspective view of the cell as completed, showing its position on a carrier shown in Fig. 1.

A indicates the body or container, preferably of a rounded form, as shown in Fig. 1, supported on a suitable base B and having a lid C for closing the top. The container is narrow in cross-section, as shown in Fig. 2, and within it is centrally carried, by means of a shaft D, a notched wheel or carrier E. The shaft outside the container is provided with a crank F, by which motion is imparted to said carrier for the purposes hereinafter explained. The freezer is designed to freeze small quantities of cream by means of a series of cells into which said cream is put. For use on the street in vending ice-cream machines are employed which will produce small quantities of cream continually, so that passers-by can be served at once, no matter how fast the cream is called for. To this end I provide the said carrier E, whose periphery is cut out in a series of notches, as already intimated. In each of these notches is set a cell for containing the cream to be frozen. These cells are indicated at G, being composed of two half-sections. (Shown in Figs. 3 and 4.) Each half consists of a cup having a flange H, which is merely an extension of the bottom. The circular wall of one of the cup portions is provided with a right-angled depression I at diametrically opposite sides, as shown in Fig. 3, such depressions extending outward. The opposite half of the cell (shown in Fig. 4) is provided with an outwardly-extending teat J at diametrically opposite sides, and these are designed to enter the depressions I before described. The flanges H at each side of the cell serve to prevent said cell sliding off the carrier. Figs. 1 and 5 show how the flanges extend below the notches in said carrier. When the cells are placed, as shown in the former figure, they just fill the space between the bottom of the notches and the curved inner surface of the container A.

In use the container is filled with the usual freezing mixture, the wheel or carrier being almost entirely covered by it. The cells G are filled with the proper cream mixture and one by one set in place in the notches of the carrier. As the crank F is turned the cells are carried down through the freezing mixture, and when all of said cells are filled and put in place a continuous movement will freeze the contents thereof in two or three minutes.

The cover C is hinged to the container and is provided with a latch for keeping it shut against any pressure from within that might be caused by moving ice, and at the same time by a touch of the finger said cover can be instantly released.

At K is an ordinary faucet through which the water from the container may pass.

The carrier is peculiarly constructed in that it has a curved arm E' between the notches of such shape and length that the cells are carried thereby when being raised toward the top of the container. It will be seen that said cells when passing down into the container toward the right, as in Fig. 1, would fall out of the notches were it not for the wall of such container, which is concentric with the path described by the arms E'. Said cells are thus held in place by the wall until arriving at the left of the machine as viewed in said Fig. 1. Here the said arms E' support and carry the cells up and over the top of the carrier and prevent them from dropping. In this way no devices are needed to hold the cells in place. When it is desired to remove a cell the contents of which have been frozen, the cover C is raised and one of them extracted, the vacated notch being filled with another cell to be similarly treated. It will be thus seen that the entire number of notches can be kept filled, and a supply of frozen cream is continually had. Evidently any-sized wheel or carrier may be employed in which any number of the cells may be used.

I desire to state that various changes may be resorted to in my improved freezer without departing from the spirit and intent of the invention, my main aim being to provide a revoluble member for carrying a series of removable cream-containing cells.

I am aware that machines have been constructed after the manner shown in the drawings for holding can for one purpose or another; but such devices do not relate in the least to ice-cream freezers, and I therefore claim as my invention the following:

1. In an ice-cream freezer, a receptacle for containing the freezing mixture, a member therein adapted to revolve in a vertical plane, there being recesses in its periphery, a series of separable cells or containers for the mixture to be frozen, the same adapted to seat in the recesses, a flange at each side of the cell for preventing the cells leaving the member sidewise, the sides and bottom of the receptacle being formed concentric with the revoluble member, the cells being held in place in the recesses during the revolution of the member in the manner described except at the upper position where they are held in place by gravity as set forth.

2. In an ice-cream freezer, the receptacle A for containing the freezing mixture, a revoluble member E therein, the same having a series of recesses therein in its periphery, in combination with a series of cells G for containing the mixture to be frozen said cells consisting of two separable portions, each said cell adapted to lie within a recess of the member E, a flange H on each portion of the cell for holding the latter in its said recess, the bottom of the receptacle A being concentric with the member, the cells being held in their recesses by contact with said bottom as described.

3. In an ice-cream freezer, the receptacle A for the freezing mixture, the member E therein having recesses in its periphery, the shaft D for carrying it and the crank F for revolving the member, in combination with a series of cells for containing the mixture to be frozen, said cells adapted to seat in the recesses in the member E, the same consisting of two members separable for the purposes described, there being the indentations I in one portion of the cell, the projections J on the other portion for engaging the indentations I for holding the two portions together, flanges H for holding the cells in place in the recesses against side movement, the bottom of the receptacle A being curved to conform to and approach the periphery of the member E to hold the cells in place in their recesses as set forth.

In testimony whereof I affix my signature in presence of two witnesses.

JAMES W. CARRIER.

Witnesses:
E. J. ABERSOL,
L. M. THURLOW.